US010111188B2

(12) United States Patent
Feng et al.

(10) Patent No.: US 10,111,188 B2
(45) Date of Patent: Oct. 23, 2018

(54) SIGNALING OF ENHANCED POWER CONTROL FOR EIMTA INTERFERENCE MITIGATION

(71) Applicant: QUALCOMM Incorporated, San Diego, CA (US)

(72) Inventors: Minghai Feng, Beijing (CN); Neng Wang, Beijing (CN); Chao Wei, Beijing (CN); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 14/781,159

(22) PCT Filed: May 9, 2014

(86) PCT No.: PCT/CN2014/077129
§ 371 (c)(1),
(2) Date: Sep. 29, 2015

(87) PCT Pub. No.: WO2014/180344
PCT Pub. Date: Nov. 13, 2014

(65) Prior Publication Data
US 2016/0066288 A1 Mar. 3, 2016

(30) Foreign Application Priority Data

May 10, 2013 (CN) .................. PCT/CN2013/075452

(51) Int. Cl.
*H04W 52/54* (2009.01)
*H04L 5/14* (2006.01)
(Continued)

(52) U.S. Cl.
CPC ........... *H04W 52/54* (2013.01); *H04L 5/1469* (2013.01); *H04W 52/143* (2013.01);
(Continued)

(58) Field of Classification Search
None
See application file for complete search history.

(56) References Cited

U.S. PATENT DOCUMENTS 7,693,130 B2 * 4/2010 Barry .................... H04J 3/0632
370/229
8,467,351 B2 * 6/2013 Liu .................... H04W 36/0094
370/332
(Continued)

FOREIGN PATENT DOCUMENTS

| CN | 102474830 A | 5/2012 |
|---|---|---|
| EP | 2983423 A1 | 2/2016 |

(Continued)

OTHER PUBLICATIONS

MCC Support, "Draft Report of 3GPP TSG RAN WG1 #72bis v0.1.0 (Chicago, USA, Apr. 15-19, 2013)," 3GPP TSG RAN WG1 Meeting #73, R1-13xxxx, Fukuoka, Japan May 20-24, 2013, 107 pgs., XP050697615, 3rd Generation Partnership Project, Sophia-Antipolis Cedex, France. Retrieved from the Internet : URL:http://www.3gpp.org/ftp/tsg_ran/WG1_RL1/TSGR1_72b/Report/ [retrieved on Apr. 24, 2013].

(Continued)

*Primary Examiner* — Ayaz Sheikh
*Assistant Examiner* — Faiyazkhan Ghafoerkhan
(74) *Attorney, Agent, or Firm* — Arent Fox LLP

(57) ABSTRACT

Methods, systems, and-devices are described for interference mitigation in a time-division duplex(TDD)wireless communication system. First and second subframe types may be identified for TDD subframes to be transmitted using the system. Different power control parameters associated with each subframe type may be identified based on transmission directions in neighboring cells for the particular subframes. One or more TDD subframes to be transmitted may be identified as a first or second subframe type, and (Continued)

power control may be applied to the transmitted subframes according the power control parameter associated with the subframe type. The identification of subframes and power control parameters to be applied to each type of subframe may be transmitted, for example, to a user equipment(UE). The information may be transmitted to a UE, for example, via radio resource control(RRC)signaling or via a physical layer control channel.

28 Claims, 13 Drawing Sheets

(51) Int. Cl.
*H04W 52/14* (2009.01)
*H04W 52/24* (2009.01)
*H04W 52/10* (2009.01)

(52) U.S. Cl.
CPC ....... *H04W 52/241* (2013.01); *H04W 52/243* (2013.01); *H04W 52/10* (2013.01); *H04W 52/146* (2013.01)

(56) References Cited

U.S. PATENT DOCUMENTS

| | | | |
|---|---|---|---|
| 8,634,364 B2 | 1/2014 | Barbieri et al. | |
| 9,088,926 B2* | 7/2015 | Liu | H04W 36/0094 |
| 9,107,150 B2* | 8/2015 | Andreozzi | H04W 72/1226 |
| 2004/0102202 A1* | 5/2004 | Kumaran | H04W 28/14 455/515 |
| 2005/0018617 A1* | 1/2005 | Jin | H04L 47/10 370/252 |
| 2006/0050640 A1* | 3/2006 | Jin | H04L 47/10 370/235 |
| 2007/0249360 A1* | 10/2007 | Das | H04L 47/10 455/450 |
| 2008/0137691 A1* | 6/2008 | Barry | H04J 3/0632 370/503 |
| 2009/0122711 A1* | 5/2009 | Soomro | H04L 43/022 370/252 |
| 2009/0252078 A1* | 10/2009 | Lim | H04B 7/155 370/315 |
| 2010/0136998 A1* | 6/2010 | Lott | H04W 16/14 455/453 |
| 2010/0255854 A1* | 10/2010 | Lee | H04W 72/082 455/450 |
| 2010/0260156 A1* | 10/2010 | Lee | H04W 56/0035 370/336 |
| 2010/0271962 A1* | 10/2010 | Han | H04L 41/0896 370/252 |
| 2010/0287263 A1* | 11/2010 | Liu | G06F 9/5088 709/221 |
| 2012/0002610 A1* | 1/2012 | Widegren | H04W 52/12 370/328 |
| 2012/0184206 A1* | 7/2012 | Kim | H04L 5/0091 455/9 |
| 2012/0282964 A1 | 11/2012 | Xiao et al. | |
| 2012/0314569 A1* | 12/2012 | Liu | H04W 36/0094 370/230 |
| 2013/0114562 A1 | 5/2013 | Seo et al. | |
| 2013/0250918 A1* | 9/2013 | Liu | H04W 36/0094 370/332 |
| 2013/0336200 A1* | 12/2013 | Andreozzi | H04W 40/22 370/315 |
| 2014/0192672 A1* | 7/2014 | Seo | H04W 24/10 370/252 |
| 2015/0110023 A1* | 4/2015 | Pan | H04W 52/244 370/329 |
| 2016/0057758 A1* | 2/2016 | Ouchi | H04W 72/0446 370/280 |
| 2016/0066281 A1* | 3/2016 | Ouchi | H04W 52/04 370/280 |
| 2016/0066288 A1* | 3/2016 | Feng | H04W 52/54 370/280 |
| 2016/0081033 A1* | 3/2016 | Ouchi | H04W 52/146 455/522 |
| 2016/0135147 A1* | 5/2016 | Ouchi | H04W 52/146 370/329 |
| 2016/0150490 A1* | 5/2016 | Ouchi | H04W 72/12 455/522 |
| 2016/0165547 A1* | 6/2016 | Ouchi | H04W 52/146 455/522 |

FOREIGN PATENT DOCUMENTS

| | | |
|---|---|---|
| JP | 2013038506 A | 2/2013 |
| WO | WO-2011119973 A1 | 9/2011 |
| WO | WO-2011130432 A1 | 10/2011 |
| WO | WO-2011133708 A1 | 10/2011 |
| WO | WO-2012107102 A1 | 8/2012 |
| WO | WO-2012138197 A2 | 10/2012 |
| WO | WO-2012141497 A2 | 10/2012 |
| WO | WO-2012152190 A1 | 11/2012 |
| WO | WO-2013004007 A1 | 1/2013 |

OTHER PUBLICATIONS

Nokia Siemens Networks et al., "PC of RACH Message 3," 3GPP TSG-RAN WG1 Meeting #53bis, R1-083096, Jeju, Korea, Aug. 18-22, 2008, 9 pgs., XP050316539, 3rd Generation Partnership Project.
Qualcomm: "Interference Mitigation Schemes for LTE TDD IMTA", 3GPP TSG RAN WG1 Meeting #72bis, R1-131628, Chicago, USA, Apr. 15-19, 2013, 6 pgs., XP050697433, 3rd Generation Partnership Project.
Renesas Mobile Europe Ltd, "Discussions on Interference Mitigation Schemes for TDD UL-DL Reconfiguration," 3GPP TSG RAN WG1 Meeting #72, R1-130419, St. Julian's, Malta, Jan. 28-Feb. 1, 2013, 5 pgs., XP050663702, 3rd Generation Partnership Project.
EPO, Supplementary European Search Report, EP App. No. EP14794123.1, dated Nov. 16, 2016, European Patent Office, Munich, DE, 12 pgs.
Texas Instruments, "Signaling Mechanisms for Adaptive TDD UL/DL Reconfiguration," 3GPP TSG RAN WG1 Meeting #72bis, R1-131502, Chicago, USA, Apr. 15-19, 2013, 4 pgs., XP050697308, 3rd Generation Partnership Project.
ZTE, "OI Enhancement in Multi-Cell Scenario," 3GPP TSG RAN WG1 Meeting #72bis, R1-131064, Chicago, USA, Apr. 15-19, 2013, 4 pgs., XP050697032, 3rd Generation Partnership Project.
ISA/CN, International Search Report and Written Opinion of the International Searching Authority, Int'l App. No. PCT/CN2013/075452, dated Feb. 13, 2014, the State Intellectual Property Office, the People's Republic of China, Beijing, CN, 12 pgs.
ISA/CN, International Search Report and Written Opinion of the International Searching Authority, Int'l App. No. PCT/CN2014/077129, dated Aug. 20, 2014, the State Intellectual Property Office, the People's Republic of China, Beijing, CN, 14 pgs.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

200

SIGNALING OF ENHANCED POWER CONTROL FOR EIMTA INTERFERENCE MITIGATION

CROSS REFERENCES

The present Application for Patent is a 371 national phase of International Patent Application No. PCT/CN2014/077129 to Qualcomm Incorporated et al., entitled "Signaling of Enhanced Power Control for eIMTA Interference Mitigation," filed May 9, 2014; which claims priority to International Patent Application No. PCT/CN2013/075452 to Qualcomm Incorporated et al., entitled "Signaling of Enhanced Power Control for eIMTA Interference Mitigation," filed May 10, 2013; each of which is assigned to the assignee hereof, and expressly incorporated by reference herein.

BACKGROUND

The following relates generally to wireless communication, and more specifically to establishing wireless communications with base stations having preferred signal transmission configurations. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Additionally, some systems may operate using time-division duplex (TDD), in which a single carrier frequency is used for both uplink and downlink communications, and some systems may operate using frequency-division duplex (FDD), in which separate carrier frequencies are used for uplink and downlink communications.

In systems that operate using TDD, different formats may be used in which uplink and downlink communications may be asymmetric. TDD formats include transmission of frames of data, each including a number of different subframes in which different subframes may be uplink or downlink subframes. Reconfiguration of TDD formats may be implemented based on data traffic patterns of the particular system, in order to provide additional uplink or downlink data capacity to users of the system.

SUMMARY

The described features generally relate to one or more improved methods, systems, and/or apparatuses for interference mitigation in a time-division duplex (TDD) wireless communication system. First and second subframe types may be identified for subframes, and different power control parameters associated with each subframe type. One or more subframes to be transmitted may be identified as a first or second subframe type and power control may be applied to the transmitted subframes according the power control parameter associated with the subframe type of the respective one or more subframes. The identification of subframes and power control parameters to be applied to each type of subframe may be transmitted, for example, to a user equipment (UE). The information may be transmitted to a UE, for example, via radio resource control (RRC) signaling or via a physical layer control channel.

In an aspect of the disclosure, a method of wireless communication in a time-division duplex (TDD) communication system is provided. The method generally includes identifying a first subframe type associated with application of a first power control parameter, identifying a second subframe type associated with application of a second power control parameter, and identifying one or more subframes to be transmitted according to the first or second power control parameter based on the subframe type of the respective one or more subframes.

In some examples, the method may also include transmitting an indication of the one or more subframes having the first subframe type and the second subframe type to a user equipment. The indication may be transmitted via radio resource control (RRC) signaling or via a physical layer control channel. The indication may include a bitmap associated with the one or more subframes, and each subframe of the one or more subframes may be associated with one or more bits of the bitmap. In some examples, a value of the one or more bits of the bitmap may indicate the subframe associated with the one or more bits as the first subframe type or the second subframe type. In some examples, the method may also include transmitting one or more of the first or second power control parameters to the user equipment via radio resource control (RRC) signaling or via a physical layer control channel.

Additionally or alternatively, the method may include determining a TDD uplink-downlink (UL-DL) configuration of a serving cell and a neighboring cell, and the identifying the first and second subframe types may be based on the TDD UL-DL configurations of the serving and neighboring cells. Additionally or alternatively, the method may include measuring an Interference over Thermal noise (IoT) for a first fixed direction subframe and a second flexible direction subframe, determining a difference in IoT between the first fixed direction and second flexible direction subframes, and the determining the first or second subframe types may be based on the difference in IoT. The first fixed direction subframe may be selected to be an uplink subframe irrespective of the TDD UL-DL configuration, for example. In some embodiments, the method may also include determining, at a serving cell, that a signal from a neighboring cell during a subframe includes a downlink (DL) reference signal (RS), and the identifying the first or second subframe types may be based on the presence of the DL RS during the subframe. Subframes in which the DL RS is present maybe identified as having the second subframe type when the corresponding subframe of the serving cell are uplink subframes.

In some embodiments, the first subframe type corresponds to subframes having uplink-uplink (UL-UL) interference between a serving cell and a neighboring cell, and the second subframe type corresponds to subframes having downlink-uplink (DL-UL) interference between the serving cell and the neighboring cell. The first power control parameter differs from the second power control parameter, according to some embodiments. In some examples, the second subframe type may correspond to remaining subframes not identified as having the first subframe type. The first power control parameter, in some embodiments, may be applied to each subframe of the first subframe type, and the second power control parameter may be applied to a subset of subframes having the second subframe type. In some embodiments, the method may also include dynamically adjusting the second uplink power control parameter within a frame.

In other embodiments, the first subframe type may correspond to subframes having uplink-uplink (UL-UL) interference between a serving cell and a neighboring cell and the second subframe type may correspond to subframes having uplink-downlink (UL-DL) interference between the serving cell and the neighboring cell, and the first power control parameter may include an uncompensated UL transmit power and the second power control parameter may include an adjustment to the UL transmit power according to UL open loop power control parameters. The UL open loop power control parameters may include, for example, a target received power ($P_O$) and a cell specific compensation factor ($\alpha$). The UL open loop power control parameters may be, for example, provided by the serving cell via radio resource control (RRC) signaling. The UL open loop power control parameters may include, for example, separate $P_O$ and $\alpha$ parameters for two or more subframes having the second subframe type, and/or an offset to $P_O$ and $\alpha$ parameters of the first power control parameter.

In another aspect of the disclosure, an apparatus for wireless communication in a time-division duplex (TDD) communication system is provided. The apparatus generally includes means for identifying a first subframe type associated with application of a first power control parameter, means for identifying a second subframe type associated with application of a second power control parameter, and means for identifying one or more subframes to be transmitted according to the first or second power control parameter based on the subframe type of the respective one or more subframes.

The apparatus may also include, for example, means for transmitting an indication of the one or more subframes having the first subframe type and the second subframe type to a user equipment. The indication may be transmitted via radio resource control (RRC) signaling or via a physical layer control channel. The indication may include a bitmap associated with the one or more subframes, and each subframe of the one or more subframes may be associated with one or more bits of the bitmap. In some examples, a value of the one or more bits of the bitmap may indicate the subframe associated with the one or more bits as the first subframe type or the second subframe type. In some examples, the apparatus may also include means for transmitting one or more of the first or second power control parameters to the user equipment via radio resource control (RRC) signaling or via a physical layer control channel.

In some embodiments, the apparatus may also include means for determining a TDD uplink-downlink (UL-DL) configuration of a serving cell and a neighboring cell, and the identification of first and second subframe types may be based on the TDD UL-DL configurations of the serving and neighboring cells. In other embodiments, the apparatus may also include means for measuring an Interference over Thermal noise (IoT) for a first fixed direction subframe and a second flexible direction subframe, and means for determining a difference in IoT between the first fixed direction and second flexible direction subframes, and the determination of the first or second subframe types may be based on the difference in IoT. The first fixed direction subframe may be selected to be an uplink subframe irrespective of the TDD UL-DL configuration, for example.

In some embodiments, the apparatus may also include means for determining, at a serving cell, that a signal from a neighboring cell during a subframe includes a downlink (DL) reference signal (RS), and the identification of the first or second subframe types may be based on the presence of the DL RS during the subframe. Subframes in which the DL RS is present may be identified as having the second subframe type when the corresponding subframe of the serving cell are uplink subframes, for example.

In other embodiments, the first subframe type may correspond to subframes having uplink-uplink (UL-UL) interference between a serving cell and a neighboring cell, and the second subframe type may correspond to subframes having downlink-uplink (DL-UL) interference between the serving cell and the neighboring cell. In some embodiments, the first power control parameter may be applied to each subframe of the first subframe type, and the second power control parameter may be applied to a subset of subframes having the second subframe type. Additionally or alternatively, the apparatus may include means for dynamically adjusting the second uplink power control parameter within a frame.

In some embodiments, the first subframe type may correspond to subframes having uplink-uplink (UL-UL) interference between a serving cell and a neighboring cell and the second subframe type may correspond to subframes having uplink-downlink (UL-DL) interference between the serving cell and the neighboring cell, and the first power control parameter may include an uncompensated UL transmit power and the second power control parameter may include an adjustment to the UL transmit power according to UL open loop power control parameters. The UL open loop power control parameters may include, for example, a target received power ($P_O$) and a cell specific compensation factor ($\alpha$), which may be provided by the serving cell via radio resource control (RRC) signaling. The UL open loop power control parameters, in some embodiments, may include separate $P_O$ and $\alpha$ parameters for two or more subframes having the second subframe type, and/or an offset to $P_O$ and $\alpha$ parameters of the first power control parameter.

In another aspect of the disclosure, another apparatus for wireless communication in a time division duplex (TDD) wireless communication system is provided The apparatus generally includes a processor, and a memory in electronic communication with the processor. The memory may include instructions stored in the memory executable by the processor to identify a first subframe type associated with application of a first power control parameter; identify a second subframe type associated with application of a second power control parameter, and identify one or more subframes to be transmitted according to the first or second power control parameter based on the subframe type of the respective one or more subframes.

In another aspect of the disclosure, a computer program product for wireless communication in a time division duplex (TDD) wireless communication system is provided. The computer program product generally includes a non-transitory computer-readable medium storing instructions executable by a processor. The instructions may be executable by the processor to identify a first subframe type associated with application of a first power control parameter, identify a second subframe type associated with application of a second power control parameter, and identify one or more subframes to be transmitted according to the first or second power control parameter based on the subframe type of the respective one or more subframes.

In a further aspect of the disclosure, another method of wireless communication in a time-division duplex (TDD) communication system is provided. The method generally includes receiving an identification of first and second subframe types associated with a TDD uplink-downlink (UL-DL) configuration, applying a first power control parameter to one or more subframes identified as having the first subframe type, applying a second power control parameter to one or more subframes identified as having the second subframe type, and transmitting the one or more subframes to a serving base station. In some embodiments, the receiving the identification may include receiving a semi-static identification of flexible subframes in radio resource control signaling, or receiving a dynamic identification of flexible subframes in signaling via a physical layer control channel such as downlink control information (DCI) received on a physical downlink control channel (PDCCH).

In some embodiments, the first power control parameter may include an uncompensated UL transmit power and the second power control parameter may include an adjustment to the UL transmit power according to UL open loop power control parameters. The UL open loop power control parameters may include, for example, a target received power ($P_O$) and a cell specific compensation factor ($\alpha$). The UL open loop power control parameters, in some embodiments, may include separate $P_O$ and $\alpha$ parameters for two or more subframes having the second subframe type.

In another aspect of the disclosure, an apparatus for wireless communication in a time-division duplex (TDD) communication system is provided. The apparatus generally includes means for receiving an identification of first and second subframe types associated with a TDD uplink-downlink (UL-DL) configuration, means for applying a first power control parameter to one or more subframes identified as having the first subframe type, means for applying a second power control parameter to one or more subframes identified as having the second subframe type, and means for transmitting the one or more subframes to a serving base station. The means for receiving the identification, in some cases, may be configured to receive a semi-static identification of flexible subframes in radio resource control signaling or a dynamic identification of flexible subframes in signaling via a physical layer control channel such as downlink control information (DCI) received on a physical downlink control channel (PDCCH), for example.

In a further aspect of the disclosure, an apparatus for wireless communication in a time division duplex (TDD) wireless communication system is provided. The apparatus generally includes a processor and a memory in electronic communication with the processor. The memory may store instructions executable by the processor to receive an identification of first and second subframe types associated with a TDD uplink-downlink (UL-DL) configuration, apply a first power control parameter to one or more subframes identified as having the first subframe type, apply a second power control parameter to one or more subframes identified as having the second subframe type, and transmit the one or more subframes to a serving base station. The identification may be a semi-static identification of flexible subframes in radio resource control signaling, or may be a dynamic identification of flexible subframes received in signaling via a physical layer control channel. The signaling may include, for example, downlink control information (DCI) received on a physical downlink control channel (PDCCH), for example.

In a further aspect of the disclosure, a computer program product for wireless communication in a time division duplex (TDD) wireless communication system is provided. The computer program product generally includes a non-transitory computer-readable medium storing instructions executable by a processor to receive an identification of first and second subframe types associated with a TDD uplink-downlink (UL-DL) configuration, apply a first power control parameter to one or more subframes identified as having the first subframe type, apply a second power control parameter to one or more subframes identified as having the second subframe type, and transmit the one or more subframes to a serving base station. The identification may be a semi-static identification of flexible subframes in radio resource control signaling, or a dynamic identification of flexible subframes received in signaling via a physical layer control channel. The signaling may include downlink control information (DCI) received on a physical downlink control channel (PDCCH), for example.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
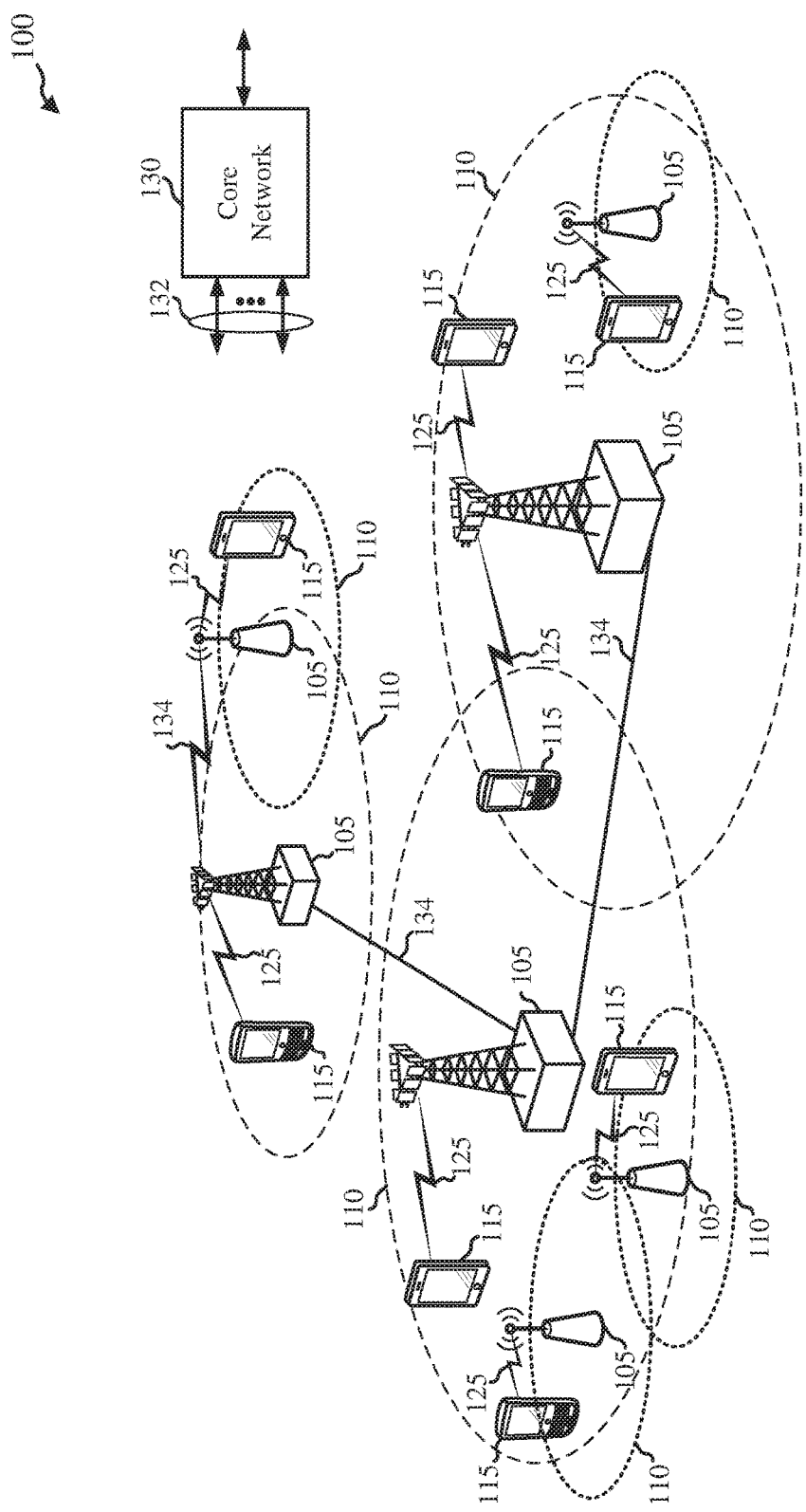
FIG. 1 is a diagram illustrating an example of a wireless communications system in accordance with various embodiments.

Various aspects of the disclosure provide for interference mitigation in a time-division duplex (TDD) wireless communication system. First and second subframe types may be identified for TDD subframes to be transmitted using the wireless communication system. Different power control parameters associated with each subframe type may be identified based on whether a serving cell and neighboring cell may have different transmission directions for the particular subframes. One or more TDD subframes to be transmitted may be identified as a first or second subframe type and power control may be applied to the transmitted subframes according the power control parameter associated with the subframe type of the respective one or more TDD subframes. The identification of subframes and power control parameters to be applied to each type of subframe may be transmitted, for example, to a user equipment (UE). The information may be transmitted to a UE, for example, via radio resource control (RRC) signaling or via a physical layer control channel.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. According to embodiments, interference mitigation for neighboring base stations 105 operating according to reconfigurable time-division duplex (TDD) communications may be implemented, as will be described in more detail below.

Base stations 105 may communicate control information and/or user data with the core network 130 through backhaul links 132. Backhaul links may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the communication devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

The system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. In embodiments, some base stations 105 may be synchronous while other base stations 105 may be asynchronous.

The communication devices 115 are dispersed throughout the system 100, and each device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A communication device 115 may be a cellular phone, a personal digital assistant (PDA), a wireless modem, a wireless communication device, a handheld device, a tablet computer, a laptop computer, a cordless phone, a wireless local loop (WLL) station, or the like. A communication device 115 may be able to communicate with macro base stations, pico base stations, femto base stations, relay base stations, and the like.

The transmission links 125 shown in network 100 may include uplink (UL) transmissions from a communication device 115 to a base station 105, and/or downlink (DL) transmissions, from a base station 105 to a communication device 115. The downlink transmissions may also be called forward link transmissions while the uplink transmissions may also be called reverse link transmissions. In embodiments, the transmission links 125 are TDD carriers carrying bidirectional traffic within traffic frames.

In embodiments, the system 100 is an LTE/LTE-A network. In LTE/LTE-A networks, the terms evolved Node B (eNB) and user equipment (UE) may be generally used to describe the base stations 105 and communication devices 115, respectively. The system 100 may be a Heterogeneous LTE/LTE-A network in which different types of eNBs 105 provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs in a closed subscriber group (CSG), UEs for users in the home, and the like). An eNB 105 for a macro cell may be referred to as a macro eNB. An eNB 105 for a pico cell may be referred to as a pico eNB. And, an eNB 105 for a femto cell may be referred to as a femto eNB or a home eNB. An eNB 105 may support one or multiple (e.g., two, three, four, and the like) cells.

The system 100 according to an LTE/LTE-A network architecture may be referred to as an Evolved Packet System (EPS) 100. The EPS 100 may include one or more UEs 115, an Evolved UMTS Terrestrial Radio Access Network (E-UTRAN), an Evolved Packet Core (EPC) 130 (e.g., core network 130), a Home Subscriber Server (HSS), and an Operator's IP Services. The EPS 100 may interconnect with other access networks using other Radio Access Technologies. For example, EPS 100 may interconnect with a UTRAN-based network and/or a CDMA-based network via one or more Serving GPRS Support Nodes (SGSNs). To support mobility of UEs 115 and/or load balancing, EPS 100 may support handover of UEs 115 between a source eNB 105 and a target eNB 105. EPS 100 may support intra-RAT handover between eNBs 105 and/or base stations of the same RAT (e.g., other E-UTRAN networks), and inter-RAT handovers between eNBs 105 and/or base stations of different RATs (e.g., E-UTRAN to CDMA, etc.). The EPS 100 may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via an X2 interface (e.g., backhaul link 134). The eNBs 105 may provide an access point to the EPC 130 for the UEs 115. The eNBs 105 may be connected by an S1 interface (e.g., backhaul link 132) to the EPC 130. Logical nodes within EPC 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple eNBs 105 through, for example, Multiple Input Multiple Output (MIMO), Coordinated Multi-Point (CoMP), or other schemes. MIMO techniques use multiple antennas on the eNBs 105 and/or multiple antennas on the UE 115 to take advantage of multipath environments to transmit multiple data streams. CoMP includes techniques for dynamic coordination of transmission and reception by a number of eNBs 105 to improve overall transmission quality for UEs 115 as well as increasing network and spectrum utilization. Generally, CoMP techniques utilize backhaul links 132 and/or 134 for communication between eNBs 105 to coordinate control plane and user plane communications for the UEs 115.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between the UE 115 and the network used for the user plane data. At the Physical layer, the transport channels may be mapped to Physical channels.

LTE/LTE-A utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

System 100 may support operation on multiple carriers, which may be referred to as carrier aggregation (CA) or multi-carrier operation. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE 115 may be configured with multiple downlink CCs and one or more uplink CCs for carrier aggregation. An eNB 105 may transmit data and control information on one or more downlink CCs to the UE 115. The UE 115 may transmit data and control information on one or more uplink CCs to the eNB 105.

The carriers may transmit bidirectional communications FDD (e.g., paired spectrum resources), TDD (e.g., unpaired spectrum resources). Frame structures for FDD (e.g., frame structure type 1) and TDD (e.g., frame structure type 2) may be defined. Each frame structure may have a radio frame length $T_1=307200|T_s=10$ ms and may include two halfframes of length $153600|T_s=5$ ms each. Each half-frame may include five subframes of length $30720|T_s=1$ ms.

Figure 2:
FIG. 2 is a table illustrating TDD Uplink-Downlink configurations in a wireless communications system in accordance with various embodiments.

For TDD frame structures, each subframe may carry UL or DL traffic, and special subframes ("S") may be used to switch between DL to UL transmission. Allocation of UL and DL subframes within radio frames may be symmetric or asymmetric and may be reconfigured semi-statically (e.g., RRC messages via backhaul, etc.). Special subframes may carry some DL and/or UL traffic and may include a Guard Period (GP) between DL and UL traffic. Switching from UL to DL traffic may be achieved by setting timing advance at the UEs without the use of Special subframes or a guard period between UL and DL subframes. UL-DL configurations with switch-point periodicity equal to the frame period (e.g., 10 ms) or half of the frame period (e.g., 5 ms) may be supported. For example, TDD frames may include one or more Special frames, and the period between Special frames may determine the TDD DL-to-UL switch-point periodicity for the frame. For LTE/LTE-A, seven different UL-DL configurations are defined that provide between 40% and 90% DL subframes as illustrated in table FIG. 2 at Table 200. As indicated in table 200, there are two switching periodicities, 5 ms and 10 ms. For configurations with 5 ms switching periodicities, there are two special subframes per frame, and for configurations with 10 ms switching periodicities there is one special subframe per frame. Some of these configurations are symmetric, having the same number of uplink and downlink subframes, while some are asymmetric, having different numbers of uplink and downlink subframes. For example, UL-DL configuration 1 is symmetric, with four uplink and four downlink subframes, UL-DL configuration 5 favors downlink throughput, and UL-DL configuration 0 favors uplink throughput.

The particular TDD UL/DL configuration that is used by aneNB 105 may be based on user requirements for the particular coverage area. For example, with reference again to FIG. 1, if a relatively large number of users in a coverage area 110 are receiving more data than they are transmitting, the UL-DL configuration for the associated eNB 105 may be selected to favor downlink throughput. Similarly, if a relatively large number of users in a coverage are 110 are transmitting more data than they are receiving, the UL-DL configuration for the associated eNB 105 may be selected to favor uplink throughput and the eNB 105 may operate using UL-DL configuration 0. In some aspects, a eNB 105 may be able to dynamically reconfigure TDD UL-DL configurations on a frame-by-frame basis. In such cases, UEs 115 that are reconfigured may receive the reconfiguration message, and transmit/receive subframes on subsequent TDD frames using the reconfigured UL-DL configuration. Such capabilities allow for relatively fast switching for the reconfigured UEs 115 according to the instantaneous traffic situation, and may provide enhanced packet throughput between the UEs 115 and eNB 105. A UE 115, for example, may be in communication with a eNB 105 using an initial TDD UL-DL configuration. This initial TDD UL-DL configuration, however, may become unfavorable for efficient packet throughput at a later point in time. For example, the user may switch from receiving a relatively large amount of data to transmitting a relatively large amount of data. In such a situation, a ratio of uplink to downlink transmission data may have a significant change, which may result a previously favorable UL-DL configuration becoming an unfavorable UL-DL configuration.

According to various embodiments, as will be described in further detail below, a TDD UL-DL configuration of aneNB may be dynamically changed based on current traffic at the eNB. However, such dynamic changes in TDD configurations may result in added interference with neighboring base stations, which may be operating using the previous TDD UL-DL configuration or which may have associated interference cancellation and/or interference mitigation techniques applied based on the previous TDD UL-DL configuration. According to various embodiments a first subframe type may be identified for TDD subframes that may have the same transmission directions for one or more neighboring eNBs. A second subframe type may be identified for TDD subframes that may have different transmission directions for one or more neighboring eNBs. Different power control parameters associated with each subframe type may be identified in order to provide enhanced interference mitigation between a serving eNB and one or more neighboring eNBs.

Figure 3:
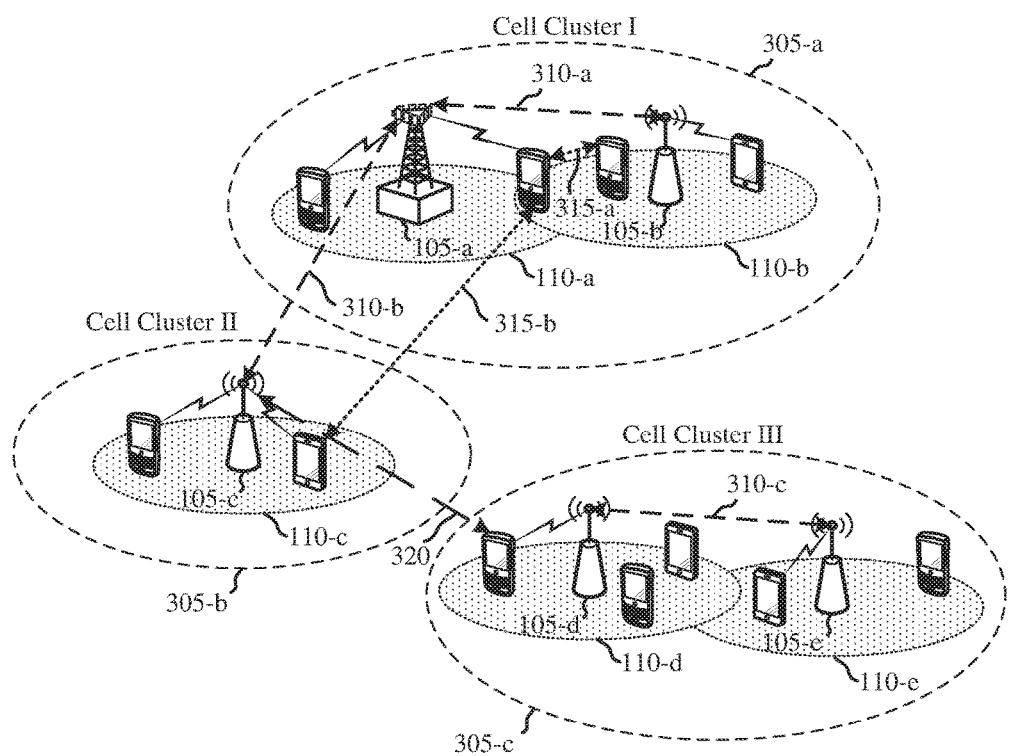
FIG. 3 illustrates a Cell Clustering Interference Mitigation environment with cells grouped according to cell clusters in accordance with various embodiments.

FIG. 3 illustrates an example of a Cell Clustering and Interference Mitigation (CCIM) system 300 with eNBs grouped according to cell clusters. CCIM system 300 may illustrate, for example, aspects of wireless communication system 100 illustrated in FIG. 1. Cell clusters can include one or more eNBs and eNBs within a cell cluster may be different types (e.g., macro eNB, pico eNB, femto eNB, and/or the like). As illustrated in the example of FIG. 3, CCIM system 300 includes cell clusters 320-a, 320-b, and 320-c. Cell cluster 320-a may include eNB 105-a and eNB 105-b, cell cluster 320-b may include eNB 105-c, and cell cluster 320-c may include eNBs 105-d and 105-e. Cell clusters 320 may be statically or semi-statically defined and each eNB 105 in a cell cluster 320 may be aware of the other eNBs 105 of its cluster. Cell clusters 320-a, 320-b, and/or 320-c may deploy TDD carriers and TDD UL-DL configuration within each cell cluster may be synchronized.

Traffic adaptation for synchronized TDD UL-DL configuration within a cell cluster may be performed by coordination of TDD UL-DL reconfiguration between cells of the cluster. Semi-static (e.g., on the order of tens of frames) TDD UL-DL reconfiguration may be performed by exchange of control-plane messaging among eNBs (e.g., via S1 and/or X2 interfaces, etc.). While semi-static TDD UL-DL reconfiguration may provide adequate performance under some conditions, when traffic conditions within the cluster change rapidly, semi-static TDD UL-DL reconfiguration may result in sub-optimal allocation of UL-to-DL subframes for TDD carriers used in the cluster. In some aspects, rapidly changing traffic conditions may be accommodated through allowing the UL-DL configuration for a particular UE 115 may be reconfigured dynamically. Such dynamic reconfiguration may be transmitted to a UE 115 through signaling from the eNB 105, such as through control channel signaling, and apply to one or more subsequent TDD frames. Such reconfigurations may be accomplished according to "enhanced Interference Management and Traffic Adaptation" (eIMTA), which may be implemented in some networks.

In such networks, eIMTA compatible UEs may receive dynamic reconfiguration messages indicating that a transmission direction for particular subframes within a TDD frame may be changed. In some networks, the adaptation rate may be relatively fast, such as 10 ms, thus providing ability in some situations to change TDD UL-DL configurations on a frame-by-frame basis. As noted above, depending upon the configuration of cells, inter-cell interference may occur. For example, with continued reference to FIG. 3, cell cluster 320-*c* could, in some scenarios, include eNB 105-*d* operating according to TDD UL-DL configuration #1 (having subframe configuration DSUUDDSUUD) and eNB 105-*e* operating according to TDD UL-DL configuration #2 (having subframe configuration DSUDDDSUDD). In such a case, uplink transmissions for eNB 105-*d* in subframes 3 and 8 may interfere with a downlink reception of UEs in communication with eNB 105-*e*. Thus, according to various embodiments, eNBs 105-*d* and 105-*e* may coordinate with themselves and with one or more UEs to reduce the likelihood of such interference. When operating according to dynamically reconfigurable TDD UL-DL configurations, according to various embodiments, dynamic and reliable determination of TDD UL-DL configuration in a frame is provided, as will be described in more detail below.

In some embodiments, uplink subframes may be divided into two groups based on uplink-to-uplink (UL-UL) or downlink-to-uplink (DL-UL) interference type, and different power control parameters for subframes in the different groups may be applied for interference mitigation. Interference may include, for example, eNB-to-eNB interference, indicated at 310-*a*, 310-*b*, and 310-*c*. Interference may also include, for example, UE-to-UE interference indicated at 315-*a* and 315-*b*, and/or UE-eNB interference indicated at 320. According to various embodiments, eNBs 105 may be assigned to a cell cluster 305 based on an interference level between neighboring cells. When operating according to dynamically reconfigurable TDD UL-DL configurations, according to various embodiments, cells within a cell cluster 305 may have a relatively high level of interference and therefore each eNB within a cell cluster may operate according to the same TDD UL-DL configuration. Neighboring cell clusters 305 may operate according to different TDD UL-DL configurations and employ one or more interference mitigation techniques. In some embodiments, signaling to indicate the TDD UL-DL configuration of a cell may be provided to other cells and/or UEs, and UEs and eNBs of the other cells may perform various interference mitigation techniques responsive to the TDD UL-DL configuration.

Figure 4:
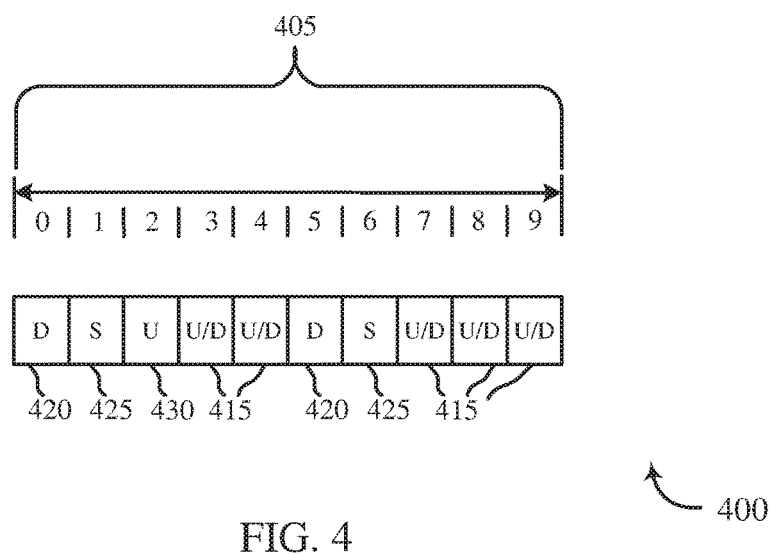
FIG. 4 shows a diagram of TDD frames with flexible subframes in accordance with various embodiments.

In some embodiments, the present disclosure provides for signaling that indicates a UL-DL configuration for one or more identified groups of subframes in TDD frames. FIG. 4 illustrates an example 400 of a TDD frame 405 in which a number of subframes may be indicated as being flexible subframes, which may be reconfigured to change transmission direction depending upon a TDD UL-DL reconfiguration. In this example, frame 405 includes 5 flexible subframes 415, two downlink subframes 420, two special subframes 425, and one uplink subframe 430. In various embodiments, such as illustrated in FIG. 4, one or more of the flexible subframes 415 may be dynamically reconfigured through eIMTA techniques. According to some embodiments, signaling of a TDD UL-DL reconfiguration by a base station may be transmitted to other cells and/or UEs. Methods of signaling TDD configuration to other cells may include, for example signaling over the S1 and/or X2 interface link. Signaling to UEs may also be provided to enable interference mitigation, which may include TDD configuration information and/or information on particular subframes that may be identified for application of different power control techniques.

Figure 5A:
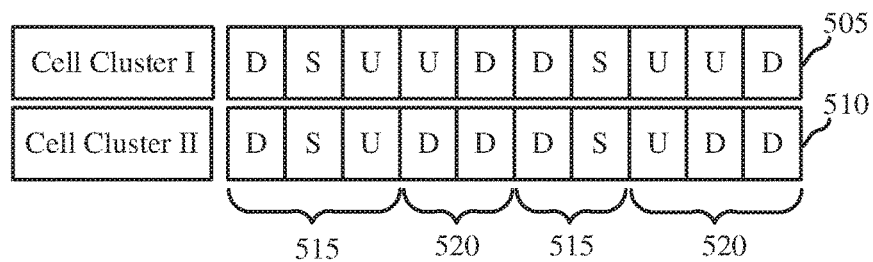
FIG. 5A shows a diagram of TDD frames of neighboring cell clusters and subframes that may have different transmit directions and associated different power control parameters in accordance with various embodiments.

As noted above, in some embodiments subframes may be divided into two groups based on potential interference type. With reference now to FIG. 5A, an example of subframe grouping 500 is discussed. In this example, cell cluster I may be operating according to TDD UL-DL configuration #1 with frame format 505, and cell cluster II may be operating according to TDD UL-DL configuration #2 with frame format 510. In this example, subframes 515 may be grouped into a first group of subframes, and subframes 520, corresponding to the flexible subframes 415 of FIG. 4, may be grouped into a second group of subframes. Within the second group of subframes 520, there may be potential for UL-DL interference between cell clusters, while within the first group of subframes there may be potential for UL-UL interference. In this example, the division of subframes into the first and second groups 515, 520, may be static based on backhaul exchange of SIB1 configurations between cells. Subframes 515, sometimes referred to as anchor subframes, may be transmitted using first power control parameters which are set based on the assumption of UL-UL interference in uplink frames. Likewise, flexible subframes 520 in such examples may be transmitted using second power control parameters which are set based on the assumption of DL-UL interference in uplink frames. A cell may then identify a first subframe type associated with application of a first power control parameter, and a second subframe type associated with application of a second power control parameter. The cell may then identify TDD subframes to be transmitted according to the first or second power control parameter based on the subframe type of the respective one or more TDD subframes.

Figure 5B:
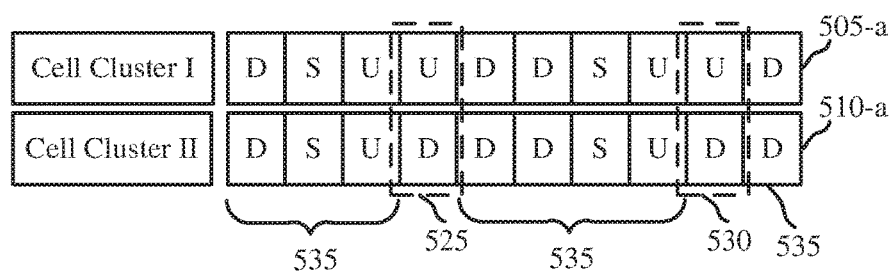
FIG. 5B shows a diagram of TDD frames of neighboring cell clusters and subframes that may have different transmit directions and associated different power control parameters in accordance with various embodiments.

As noted, the division of subframes such as in the example of FIG. 5A may be static or semi-static and may be provided to neighboring cells through a backhaul exchange of SIB1 configurations. In other embodiments, dynamic division of subframes into first and second groups may be used to provide interference mitigation. With reference now to FIG. 5B, an example 500-*a* of dynamic subframe grouping is discussed. In this example, cell cluster I may be operating according to TDD UL-DL configuration #1 with frame format 505-*a*, and cell cluster II may be operating according to TDD UL-DL configuration #2 with frame format 510-*a*. In this example, only subframes having different transmit directions, namely subframes 525 and 530, are grouped into the second group of subframes, with the remaining subframes 535 grouped into the first group of subframes. Thus, in this example, within the second group of subframes 525, 530, there is UL-DL interference between cell clusters, while within the first group of subframes 535 there is UL-UL interference only. In this example, the division of subframes into the first and second groups may be dynamic, and identification of the first and second groups of subframes may occur when the TDD UL-DL configuration for a cell is changed. The division of subframes into the first and second groups, in some embodiments, may be based on inter-cell coordination and/or eNB-eNB measurements. Subframes 525 and 530 may be transmitted using second power control parameters which are set based on DL-UL interference in uplink frames, and the remaining subframes 535 may be transmitted using first power control parameters which are set based on UL-UL interference in uplink frames.

According to various embodiments, identification of subframes belonging to the different groups may be performed in a number of different ways. For example, is some embodiments, a cell may determine subframes having a common UL direction based on backhaul exchanged configurations between cells, and may then determine that other subframes belong to the second group of subframes. In other embodiments, a cell may measure interference over thermal noise (IoT) for different subframes of a neighboring cell, and determine transmission directions of the subframes based on a difference in IoT for the different subframes. IoT may be measured, for example, for a first fixed-direction subframe and a second flexible direction subframe, with a difference in IoT values indicating differences in transmit directions of the subframes. For example, a cell may measure IoT on subframe #2 of a frame (which is an uplink subframe in each of the noted TDD UL-DL configurations, and thus an uplink subframe irrespective of the TDD UL-DL configuration), and measure IoT on one or more other subframes. If the measured IoT of the other subframe is higher than the IoT of subframe #2, it may be determined that the particular subframe is a downlink subframe and therefore should be identified as belonging to the second group of subframes. In some embodiments, such a measurement may be performed only during predetermined subframes, such as during subframes that are designated as flexible subframes. In still further embodiments, a cell may identify the different groups of subframes based on the presence of a downlink reference signal (DL RS), such as a cell-specific reference signal (CRS), in a flexible subframe. In some cases, CRS is transmitted in downlink subframes, and if a CRS is detected from a neighboring cell in an uplink subframe of a serving cell, the subframe may be identified as belonging to the second group of subframes, with other subframes identified as belonging to the first group of subframes.

With continued reference to FIGS. 5A and 5B, as mentioned above, different power control parameters may be applied for the first group of subframes 515, 535 and for the second group of subframes 520, 525, 530. In some embodiments, one set of UL power control parameters for the first group of subframes 515, 535 may be applied, and another set of UL power control parameters may be applied to the second group of subframes 520, 525, 530. In such embodiments, a first power control parameter may be applied to each subframe in the first groups 515, 535, and a second power control parameter may be applied each of the subframes 520, 525, 530 of the second group of subframes. In further embodiments, the firstpower control parameter may be used for the first group of subframes 515, 535, and subframe dependent UL power control parameters may be applied for the second group of subframes 520, 525, 530.

Power control parameters for the first and second groups of subframes may include open loop power control (OLPC) parameters, such as a target received power ($P_O$) parameters and a cell specific compensation factor ($\alpha$). In some embodiments, the UL OLPC parameters may include separate $P_O$ and $\alpha$ parameters for two or more subframes having the second subframe type.

Uplink fractional open loop power control is specified according LTE/LTE-A specifications as follows:

$$P_{PUSCH}(i) = \min\{P_{CMAX}, 10\log_{10}(M_{PUSCH}(i)) + P_{O\_PUSCH}(j) + \alpha(j) \cdot PL\}$$

where:

$P_{O\_PUSCH}$ consists of a cell specific component $P_{O\_nominal\_PUSCH}$ and a UE specific component $P_{O\_UE\_PUSCH}$;

$\alpha$ is a 3-bit cell specific parameter provided by higher layers, $M_{PUSCH}$ is the number of resource blocks on which the mobile is transmitting in subframe i, and PL is the downlink path loss.

In some embodiments, UL OLPC parameters may be selected according to established techniques for subframes identified as being in the first group of subframes, and UL OLPC parameters may be selected to result in a power increase for UL transmit power of a UE in a serving cell for subframes in the second group of subframes. Such OLPC parameters may provide enhanced performance of the physical UL control channel (PUCCH) and the physical UL shared channel (PUSCH) in UL subframe associated with the second group of subframes. Thus, a first set of power control parameters, ($P_O$, $\alpha$) may be provided for the first type of subframes, and a second set of power control parameters($P_O^*$, $\alpha^*$) may be provided for the second type of subframes. The second set of power control parameters may be determined based on increased pathloss resultant from the presence of UL-DL interference, and thus provide a higher transmit power for subframes in the second group of subframes.

Signaling of power control parameters may be transmitted in any of a number of different manners. In some embodiments, existing RRC signaling for (Po, $\alpha$) may be used for the first group of subframes 515, 535, and a new OLPC signaling may be provided for subframes in the second group of subframes 520, 525, 530.

Figure 5C:
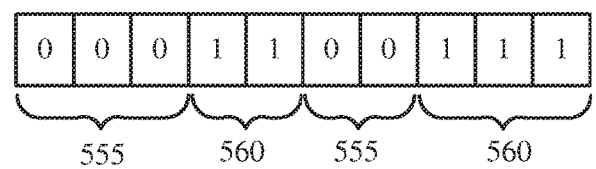
FIG. 5C shows a diagram illustrating an example of a bitmap for a subframe grouping in accordance with various embodiments.

In embodiments using semi-static UL power control parameter signaling, signaling may be defined to identify subframes of the second group of subframes. Such signaling may include, for example, a bitmap in which each bit represents a subframe, with a "0" indicating the associated subframe is in the first group of subframes, and a "1" indicating the associated subframe is in the second group of subframes. FIG. 5C illustrates an example of a bitmap 550 for the subframe grouping 500. The "0" bits 555 indicate subframes that are in the first group of subframes 515. The "1" bits 560 indicate subframes that in the second group of subframes 520. In other examples, the signaling may include the transmission of several bits to indicate subframes in the second group of subframes. For example, a three-bit indicator may be used to map eight available sets of subframes in the second group of subframes. The transmission of the bitmap or bits may be defined, for example, in RRC signaling or in a physical layer control channel, such as the PDCCH.

The signaling of power control parameters, as noted above, may include a second set of OLPC parameters for the second group of subframes. In some embodiments, a second pair of absolute (Po, $\alpha$) values may be provided, namely ($P_O^*$, $\alpha^*$), which may be transmitted in RRC signaling and used for the second group of subframes. In other embodiments, an offset to existing ($P_O$, $\alpha$) values may be provided and transmitted in RRC signaling for application to the second group of subframes. In such embodiments, an eNB of a cell may semi-statically change the UL OLPC parameters for the second group of subframes via RRC signaling.

In other embodiments, UL OLPC parameters may be provided dynamically for application to particular subframes of the second group of subframes. In embodiments where absolute values are provided for OLPC parameters, such parameters may be signaled in one of a number of different manners. In some examples, a number of pairs of ($P_O^*$, $\alpha^*$) values may be defined, along with $\log_2(N)$ bits which may be mapped to indicate which pair of ($P_O^*$, $\alpha^*$) is used. In other examples, several bits may be signaled, with different bit values mapped to indicate a new pair of ($P_O^*$, $\alpha^*$) absolute values. In each case, $P_O^*$, or $\alpha^*$, or both $P_O^*$ and $\alpha^*$ may be different for different subframes in the second group of subframes. In embodiments where an offset to existing ($P_O$, $\alpha$) values are used, a number of different offset values may be defined, for example, with a M bits mapped to the different offsets to indicate which offset is used. Such offsets may include, for example, $P_O$ offset, $\alpha$ offset or joint consideration of $P_O$ and $\alpha$. Signaling bits of absolute or offset ($P_O$, $\alpha$) value may be transmitted using physical layer signaling, such as PDCCH signaling. Such signaling may include adding new bits in downlink control information format 0 (DCI 0) or an extension to a transmit power control (TPC) command, through adding new bits in a DL grant DCI format (e.g. DCI 1C), or through the definition of a new DCI format, to name a few examples. In such a manner, an eNB may, according to various embodiments, dynamically change the UL power control parameters for the second group of subframes via physical layer signaling.

In some embodiments, an adjustment to OLPC parameters may decrease the transmit power of UEs at a cell edge too much. In order to avoid too significant of a transmit power reduction in such cases, some embodiments provide a transmit power (Ptx) as:

$$Ptx = \max(Ptx(Po, \alpha), Ptx(Po^*, \alpha^*))$$

Where (Po, $\alpha$) are OLPC parameters for subframe group one, and (Po,*$\alpha$*) are OLPC parameters for subframe group two.

Thus, interference mitigation and dynamic resource allocation in eIMTA systems may be provided according to various aspects of the present disclosure through identification of groups of subframes and power control parameters that may be applied to groups of subframes according to different initial TDD UL-DL configurations.

Figure 6:
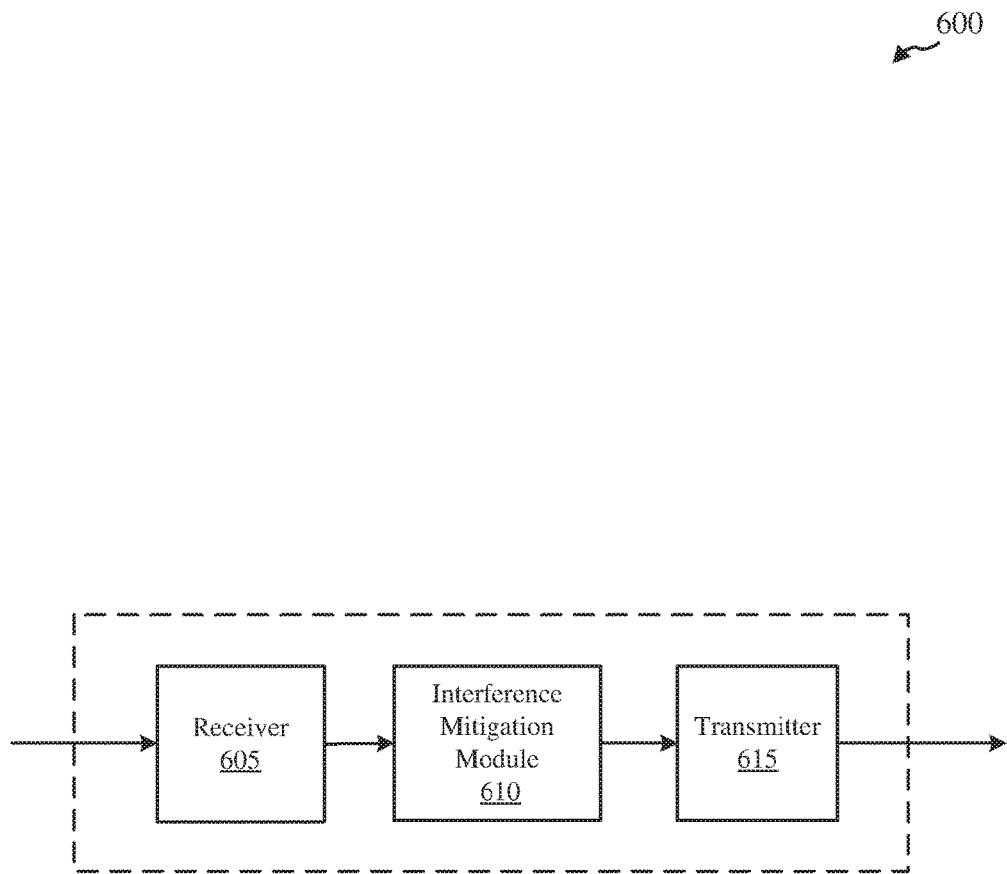
FIG. 6 shows a block diagram of an example of a base station in accordance with various embodiments.

FIG. 6 shows a block diagram of a network entity device 600 that may provide interference mitigation according to various embodiments. The network entity device 600 may be a portion of aneNB 105, UE 115, core network 130, or other device of the system 100 depicted in FIG. 1, or system 300 of FIG. 3. Device 600 includes a receiver 605 that may receive one or more indications related to TDD UL-DL configurations of one or more cells. Interference mitigation module 610 may determine interference mitigation to be provided based on the TDD UL-DL configurations. For example, interference mitigation module 610 may identify first and second types of subframes that are to have first or second power control parameters applied thereto. Interference mitigation module 610 may also, in some embodiments, determine one or more power control parameters that are to be applied to subframes that are to be transmitted using the wireless communication system. Transmitter 615 may transmit interference mitigation information for use in transmission of subframes in the wireless communications system.

Figure 7:
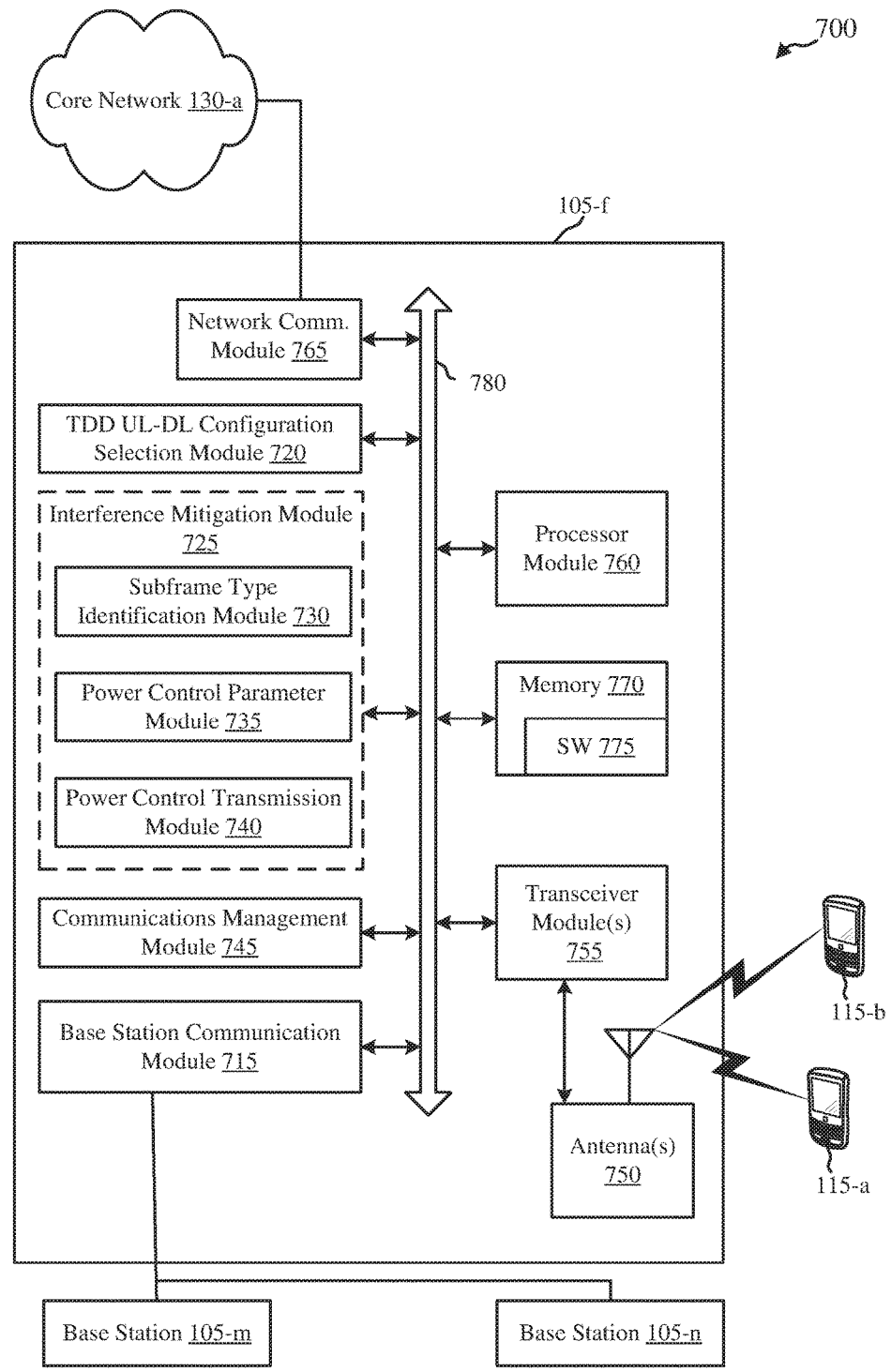
FIG. 7 shows a block diagram of another example of a base station in accordance with various embodiments.

FIG. 7 shows a block diagram of a communications system 700 that may be configured for interference mitigation based on reconfiguration of TDD UL-DL configuration. This system 700 may be an example of aspects of the system 100 depicted in FIG. 1, or system 300 of FIG. 3. Base station 105-$f$ may be an example of aneNB 105 of FIG. 1 or 3, or may be an example of device 600 of FIG. 6. System 700 may include a base station 105-$f$. The base station 105-$f$ may include antenna(s) 750, a transceiver module 755, memory 770, and a processor module 760, which each may be in communication, directly or indirectly, with each other (e.g., over one or more buses 780). The transceiver module 755 may be configured to communicate bi-directionally, via the antenna(s) 750, with UEs 115-$a$, 115-$b$. The transceiver module 755 (and/or other components of the base station 105-$f$) may also be configured to communicate bi-directionally with one or more networks. In some cases, the base station 105-$f$ may communicate with the core network 130-$a$ through network communications module 765. Base station 105-$f$ may be an example of an eNodeB base station, a Home eNodeB base station, a NodeB base station, and/or a Home NodeB base station.

Base station 105-$f$ may also communicate with other base stations, such as base station 105-$m$ and base station 105-$n$. In some cases, base station 105-$f$ may communicate with other base stations such as 105-$m$ and/or 105-$n$ utilizing base station communication module 715. In some embodiments, base station communication module 715 may provide an X2 interface within an LTE wireless communication technology to provide communication between some of the base stations 105. In some embodiments, base station 105-$f$ may communicate with other base stations through core network 130-$a$.

The memory 770 may include random access memory (RAM) and read-only memory (ROM). The memory 770 may also store computer-readable, computer-executable software code 775 containing instructions that are configured to, when executed, cause the processor module 760 to perform various functions described herein (e.g., TDD UL-DL reconfiguration, interference mitigation, power control parameter determination, etc.). Alternatively, the computer-executable software code 775 may not be directly executable by the processor module 760 but be configured to cause the processor, e.g., when compiled and executed, to perform functions described herein.

The processor module 760 may include an intelligent hardware device, e.g., a central processing unit (CPU), a microcontroller, an application-specific integrated circuit (ASIC), etc. The transceiver module(s) 755 may include a modem configured to modulate the packets and provide the modulated packets to the antenna(s) 750 for transmission, and to demodulate packets received from the antenna(s) 750. While some examples of the base station 105-$f$ may include a single antenna 750, the base station 105-$f$ may include multiple antennas 750 for multiple links which may support carrier aggregation. For example, one or more links may be used to support macro communications with UEs 115-$a$, 115-$b$.

According to the architecture of FIG. 7, the base station 105-$f$ may further include a communications management module 745. The communications management module 745 may manage communications with other base stations 105. By way of example, the communications management module 745 may be a component of the base station 105-*f* in communication with some or all of the other components of the base station 105-*f* via a bus 780. Alternatively, functionality of the communications management module 745 may be implemented as a component of the transceiver module 755, as a computer program product, and/or as one or more controller elements of the processor module 760.

In some embodiments, base station 105-*f* includes a TDD UL-DL configuration selection module that may determine TDD UL-DL configurations for various UEs communicating with the base station 105-*f*. Interference mitigation module 725 may perform interference mitigation techniques such as described above. In the example of FIG. 7, interference mitigation module 725 includes a subframe type identification module 730 that may identify subframe types for use in determining power control parameters to apply for interference mitigation. Subframe types may be identified, as discussed above, through signaling from other base stations, and/or through determination of transmission directions such as through IoT measurements or CRS detection, for example. Power control parameter module 735 may determine power control parameters for application to first and/or second types of subframes, similarly as described above. Power control transmission module 740 may provide information related to power control parameters and/or subframe types and subframe groups to one or more UEs 115-*a*, 115-*b*. The UEs 115-*a*, 115-*b* may operate according to the power control parameters, and thus interference in the system that may result from TDD UL-DL configuration differences between neighboring base stations may be mitigated.

Figure 8:
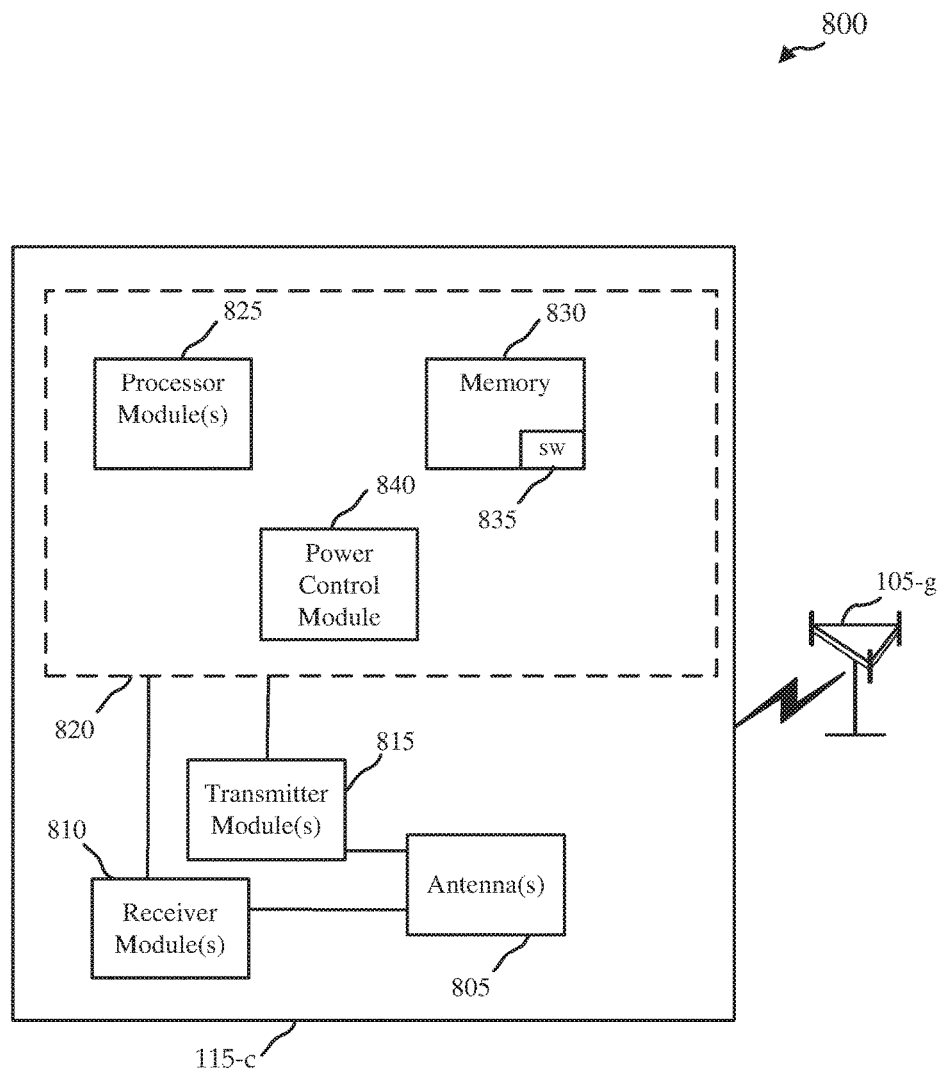
FIG. 8 shows a block diagram of an example of a user equipment in accordance with various embodiments.

According to some examples, a base station may determine the TDD UL-DL configuration and reconfiguration associated with a UE and one or more neighboring base stations, and also transmit information related to interference mitigation that the UE is to use for communication with the base station. The UE will receive this information and perform communications as indicated by the base station. With reference now to FIG. 8, an example wireless communication system 800 that performs interference mitigation for different TDD UL-DL configurations is depicted. System 800 includes a UE 115-*c* that may communicate with base station 105-*g* to receive access to one or more wireless networks, and may be an example of aspects of the system 100 of FIG. 1, system 300 of FIG. 3, or system 700 of FIG. 7. UE 115-*c* may be an example of a UE 115 of FIG. 1, 3, or 7, or may be an example of device 600 of FIG. 6. UE 115-*c*, includes one or more antenna(s) 805 communicatively coupled to receiver module(s) 810 and transmitter module(s) 815, which are in turn communicatively coupled to a control module 820. Control module 820 includes one or more processor module(s) 825, a memory 830 that may include computer-executable softwarecode 835, and a power control module 840. The computer-executable softwarecode 835 may be for execution by processor module 825 and/or power control module 840.

The processor module(s) 825 may include an intelligent hardware device, e.g., a central processing unit (CPU), a microcontroller, an application specific integrated circuit (ASIC), etc. The memory 830 may include random access memory (RAM) and read-only memory (ROM). The memory 830 may store computer-readable, computer-executable software code 835 containing instructions that are configured to, when executed (or when compiled and executed), cause the processor module 825 and/or power control module 840 to perform various functions described herein. The power control module 840 may be implemented as a part of the processor module(s) 825, or may be implemented using one or more separate CPUs or ASICs, for example. The transmitter module(s) 815 may transmit to base station 105-*g* (and/or other base stations) to establish communications with one or more wireless communications networks (e.g., E-UTRAN, UTRAN, etc.), as described above. The transmit power used by the transmitter module(s) may be based on power control parameters provided by power control module 840. The power control module 840 may be configured to receive subframe type and power control parameters from base station 105-*g* and change power control parameters for TDDsubframes based on the type of subframe and associated power control parameter, such as based on the receipt of a bitmap or other indication of configuration mapped to particular subframe configurations, such as described above. Power control may be performed based on identified power control parameters, which may include OLPC parameters, offsets to OLPC and/or other information such as described above. The receiver module(s) 810 may receive downlink transmissions from base station 105-*g* (and/or other base stations), such as described above. Downlink transmissions are received and processed at the user equipment 115-*c*. The components of UE 115-*c* may, individually or collectively, be implemented with one or more Application Specific Integrated Circuits (ASICs) adapted to perform some or all of the applicable functions in hardware. Each of the noted modules may be a means for performing one or more functions related to operation of the UE 115-*c*.

Figure 9:
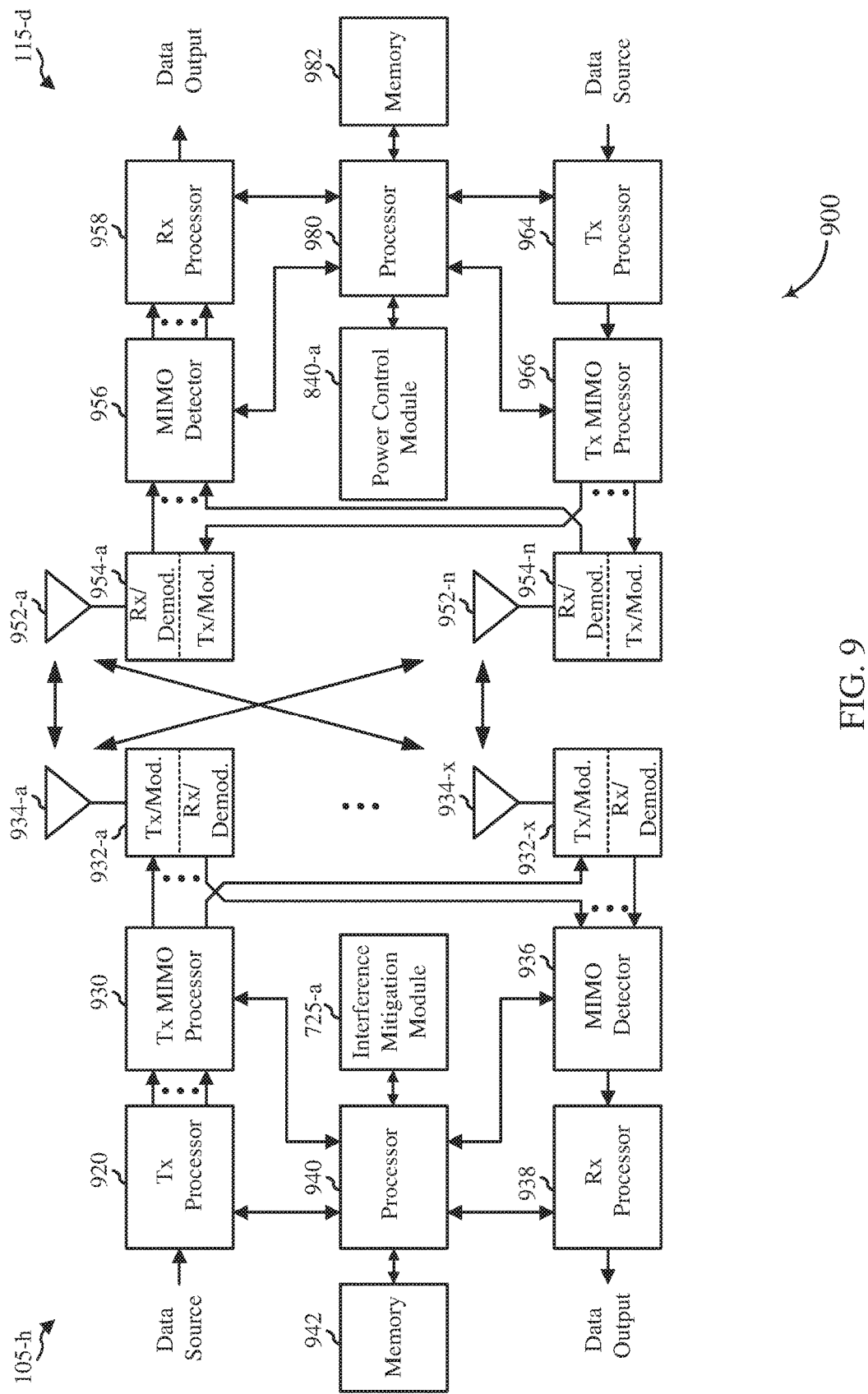
FIG. 9 shows a block diagram of an example of a user equipment and base station in accordance with various embodiments.

FIG. 9 is a block diagram of a system 900 including a base station 105-*h* and a UE 115-*d*. This system 900 may be an example of the system 100 of FIG. 1, system 300 of FIG. 3, system 800 of FIG. 8, or method 1000 of FIG. 10. The base station 105-*h* may be equipped with antennas 934-*a* through 934-*x*, and the UE 115-*d* may be equipped with antennas 952-*a* through 952-*n*. At the base station 105-*h*, a transmit processor 920 may receive data from a data source.

The transmit processor 920 may process the data. The transmit processor 920 may also generate reference symbols, and a cell-specific reference signal. A transmit (TX) MIMO processor 930 may perform spatial processing (e.g., precoding) on data symbols, control symbols, and/or reference symbols, if applicable, and may provide output symbol streams to the transmit modulators 932-*a* through 932-*x*. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink (DL) signal. In one example, DL signals from modulators 932-*a* through 932-*x* may be transmitted via the antennas 934-*a* through 934-*x*, respectively according to a particular TDD Uplink/Downlink configuration.

At the UE 115-*d*, the mobile device antennas 952-*a* through 952-*n* may receive the DL signals according to the particular TDD Uplink/Downlink configuration from the base station 105-*h* and may provide the received signals to the demodulators 954-*a* through 954-*n*, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954-*a* through 954-*n*, perform MIMO detection on the received symbols if applicable, and provide detected symbols. A receive processor 958 may process (e.g., demodulate, deinterleave, and decode) the detected symbols, providing decoded data for the UE 115-*d* to a data output, and provide decoded control information to a processor 980, or memory 982. The processor 980 may be coupled with a power control module 840-*a* that may perform power control through application of power control parameters for different groups of identified subframes to provide interference mitigation for neighboring cells that may have different TDD UL-DL configurations, such as described above.

On the uplink (UL), at the UE 115-*d*, a transmit processor 964 may receive and process data from a data source. The transmit processor 964 may also generate reference symbols for a reference signal. The symbols from the transmit processor 964 may be precoded by a transmit MIMO processor 966 if applicable, further processed by the demodulators 954-*a* through 954-*n* (e.g., for SC-FDMA, etc.), and be transmitted to the base station 105-*h* in accordance with the transmission parameters received from the base station 105-*h* and power control parameters provided by power control module 840-*a*. At the base station 105-*h*, the UL signals from the UE 115-*d* may be received by the antennas 934, processed by the modulators 932, detected by a MIMO detector 936 if applicable, and further processed by a receive processor 938. The receive processor 938 may provide decoded data to a data output and to the processor 940. A memory 942 may be coupled with the processor 940. The processor 940 may perform frame formatting according to a current TDD UL/DL configuration. A interference mitigation module 725-*a* may, in some embodiments, identify groups of subframes according to a type of interference that may be present during transmission of the subframes, and identify power control parameters to apply to the different groups of subframes, such as described above. Similarly as discussed above, system 900 may support operation on multiple component carriers, each of which include waveform signals of different frequencies that are transmitted between base station 105-*h* and UE 115-*d*. Multiple component carriers may carry uplink and downlink transmissions between UE 115-*d* and base station 105-*h*, and base station 105-*h* may support operation on multiple component carriers that may each have different TDD configurations. The components of the UE 115-*d* may, individually or collectively, be implemented with one or more Application Specific Integrated Circuits (ASICs) adapted to perform some or all of the applicable functions in hardware. Each of the noted modules may be a means for performing one or more functions related to operation of the system 900. Similarly, the components of the base station 105-*h* may, individually or collectively, be implemented with one or more Application Specific Integrated Circuits (ASICs) adapted to perform some or all of the applicable functions in hardware. Each of the noted components may be a means for performing one or more functions related to operation of the system 900.

Figure 10:
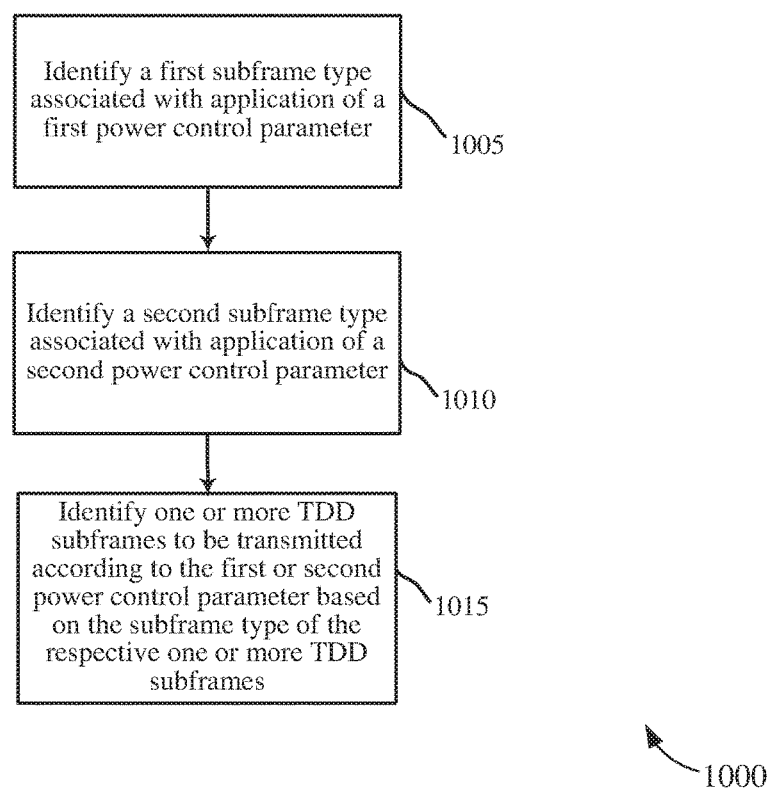
FIG. 10 is a flowchart of a method for TDD wireless communications in accordance with various embodiments.

FIG. 10 illustrates a method 1000 that may be carried out by a UE, a base station, or other entity in a wireless communications system according to various embodiments. The method 1000 may, for example, be performed by a UE or base station of FIG. 1, 3, 7, 8, or 9, or device 600 of FIG. 6, or using any combination of the devices described for these figures. Initially, at block 1005, a first subframe type associated with application of a first power control parameter is identified. At block 1010, a second subframe type associated with application of a second power control parameter is identified. Finally, at block 1015, one or more TDD subframes to be transmitted according to the first or second power control parameter based on the subframe type of the respective one or more TDD subframes are identified. The TDD subframes may be identified, and power control parameters applied as described above for various examples.

Figure 11:
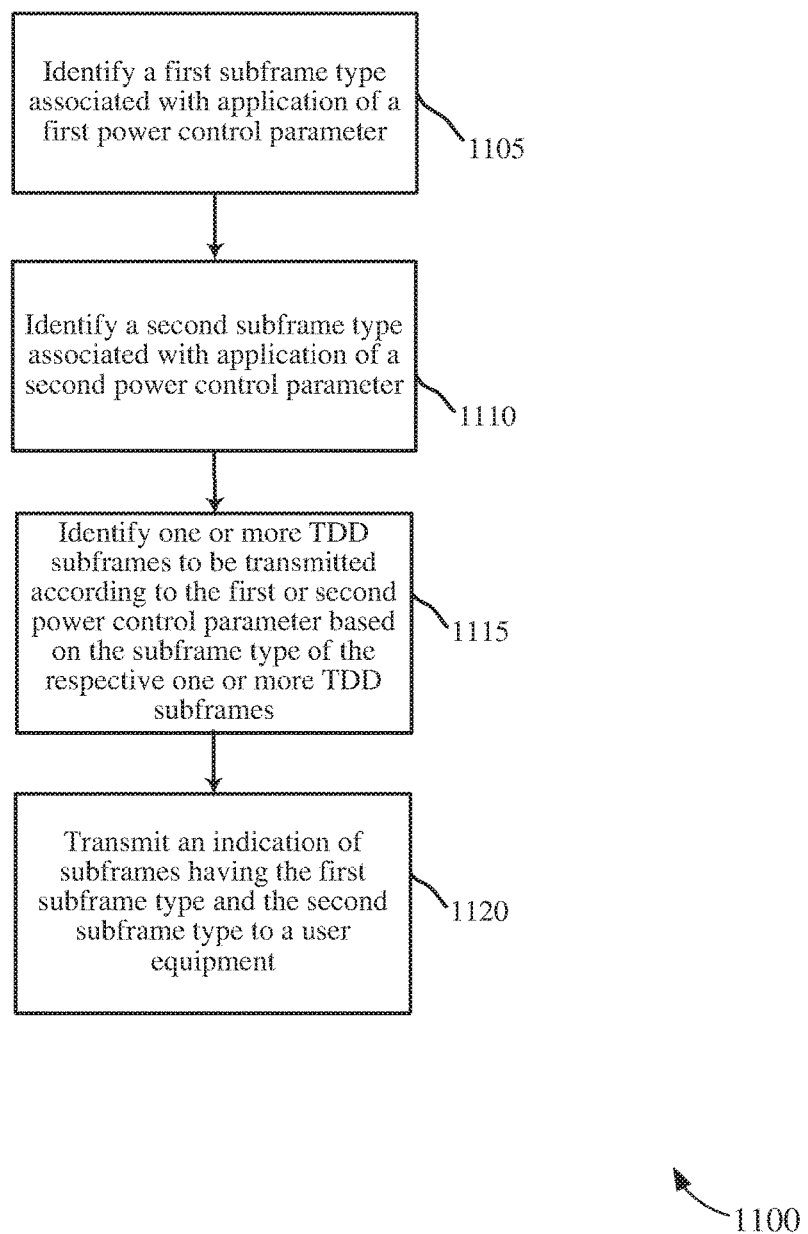
FIG. 11 is a flowchart of a method for TDD wireless communications in accordance with various embodiments.

FIG. 11 illustrates a method 1100 that may be carried out by a base station, or other entity in a wireless communications system according to various embodiments. The method 1100 may, for example, be performed by a base station or core network component of FIG. 1, 3, 7, 8, or 9, or device 600 of FIG. 6, or using any combination of the devices described for these figures. Initially, at block 1105, a first subframe type associated with application of a first power control parameter is identified. At block 1110, a second subframe type associated with application of a second power control parameter is identified. At block 1115, one or more TDD subframes to be transmitted according to the first or second power control parameter based on the subframe type of the respective one or more TDD subframes are identified. Finally, an indication of subframes having the first subframe type and the second subframe type may be transmitted to a user equipment The TDD subframes may be identified, and power control parameters applied as described above for various examples.

Figure 12:
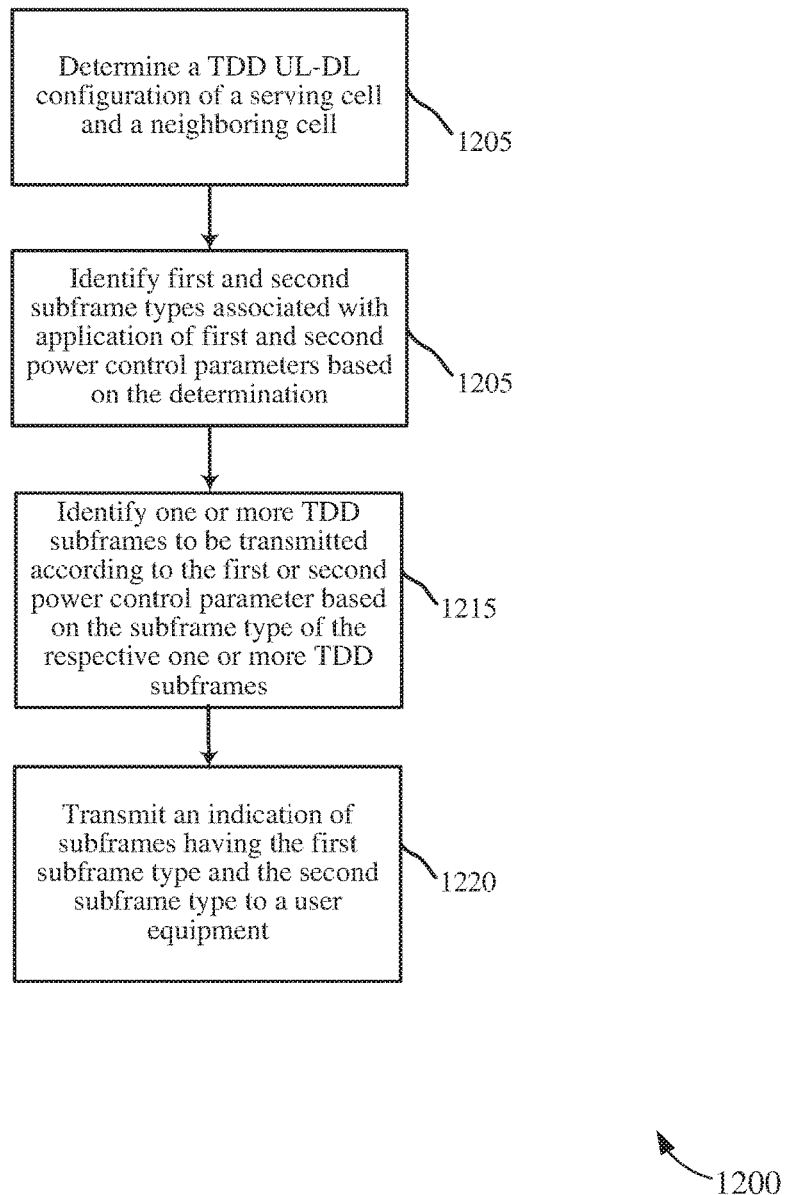
FIG. 12 is a flowchart of a method for TDD wireless communications in accordance with various embodiments.

FIG. 12 illustrates a method 1200 that may be carried out by a base station, or other entity in a wireless communications system according to various embodiments. The method 1200 may, for example, be performed by a base station or core network component of FIG. 1, 3, 7, 8, or 9, or device 600 of FIG. 6, or using any combination of the devices described for these figures. Initially, at block 1205, a TDD UL-DL configuration of a serving cell and a neighboring cell are determined. The TDD UL-DL configuration may be determined, for example, by receiving an indication of the configuration through a backhaul link, and/or by evaluating transmissions of a neighboring cell, such as described above. At block 1210, first and second subframe types associated with application of first and second power control parameters, respectively, are identified. At block 1215, one or more TDD subframes to be transmitted according to the first or second power control parameter based on the subframe type of the respective one or more TDD subframes are identified. Finally, an indication of subframes having the first subframe type and the second subframe type may be transmitted to a user equipment The TDD subframes may be identified, and power control parameters applied as described above for various examples.

Figure 13:
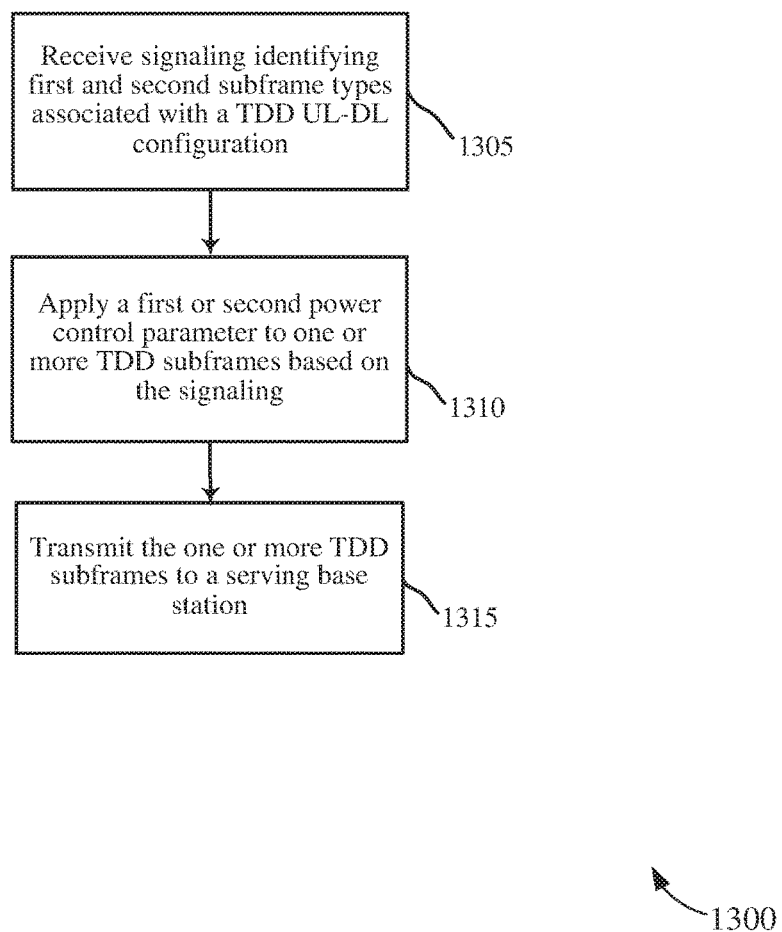
FIG. 13 is a flowchart of a method for TDD wireless communications in accordance with various embodiments.

FIG. 13 illustrates a method 1300 that may be carried out by a UE in a wireless communications system according to various embodiments. The method 1300 may, for example, be performed by a UE of FIG. 1, 3, 7, 8, or 9, or device 600 of FIG. 6, or using any combination of the devices described for these figures. Initially, at block 1305, signaling is received identifying first and second subframe types associated with a TDD UL-DL configuration. The signaling may include, for example, a semi-static identification of flexible subframes in radio resource control signaling, or a dynamic identification of flexible subframes in a physical layer control channel signal. In some examples, the signaling may include downlink control information (DCI) received on a physical downlink control channel (PDCCH). At block 1310, a first or second power control parameter is applied to one or more TDD subframes based on the signaling. The first power control parameter may include, for example, an uncompensated UL transmit power and the second power control parameter may include, for example, an adjustment to the UL transmit power according to UL open loop power control parameters such as a target received power ($P_O$) and a cell specific compensation factor ($\alpha$). In some cases, the OLPC parameters may include separate $P_O$ and $\alpha$ parameters for two or more subframes having the second subframe type. Finally, at block 1315, the one or more TDD subframes are transmitted to a serving base station.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication in a time-division duplex (TDD) communication system, comprising:
    receiving a bitmap identifying a first group of one or more subframes of a TDD uplink-downlink (UL-DL) configuration having a first subframe type and a second group of one or more subframes of the TDD UL-DL configuration having a second subframe type, wherein the first subframe type corresponds to one or more subframes having UL-UL interference between a serving base station and a neighboring base station, and the second subframe type corresponds to one or more subframes having DL-UL interference between the serving base station and the neighboring base station;
    receiving a first indication of a first power control parameter via radio resource control (RRC) signaling, and a second indication of a second power control parameter via Open Loop Power Control (OLPC) signaling;
    applying the first power control parameter to the first group of one or more subframes identified in the bitmap as having the first subframe type;
    applying the second power control parameter to the second group of one or more subframes identified in the bitmap as having the second subframe type; and
    transmitting the one or more subframes to the serving base station.

2. The method of claim 1, wherein the bitmap is received in radio resource control signaling.

3. The method of claim 1, wherein the bitmap is received in signaling via a physical layer control channel.

4. The method of claim 3, wherein the signaling comprises downlink control information (DCI) received on a physical downlink control channel (PDCCH).

5. The method of claim 3, wherein the first power control parameter comprises an uncompensated UL transmit power and the second power control parameter comprises an adjustment to the UL transmit power according to UL open loop power control parameters.

6. The method of claim 5, wherein the UL open loop power control parameters comprise a target received power (PO) and a cell specific compensation factor (α).

7. The method of claim 6, wherein the UL open loop power control parameters comprise separate PO and α parameters for two or more subframes having the second subframe type as identified in the bitmap.

8. An apparatus for wireless communication in a time-division duplex (TDD) communication system, comprising:
- means for receiving a bitmap identifying a first group of one or more subframes of a TDD uplink-downlink (UL-DL) configuration and a second group of one or more subframes of the TDD UL-DL configuration having a second subframe type, wherein the first subframe type corresponds to one or more subframes having UL-UL interference between a serving base station and a neighboring base station, and the second subframe type corresponds to one or more subframes having DL-UL interference between the serving base station and the neighboring base station;
- means for receiving a first indication of a first power control parameter via radio resource control signaling, and a second indication of a second power control parameter via Open Loop Power Control (OLPC) signaling;
- means for applying the first power control parameter to the first group of one or more subframes identified in the bitmap as having the first subframe type;
- means for applying the second power control parameter to the second group of one or more subframes identified in the bitmap as having the second subframe type; and
- means for transmitting the one or more subframes to the serving base station.

9. The apparatus of claim 8, wherein the bitmap is received in radio resource control signaling.

10. The apparatus of claim 8, wherein the bitmap is received in signaling via a physical layer control channel.

11. The apparatus of claim 10, wherein the signaling comprises downlink control information (DCI) received on a physical downlink control channel (PDCCH).

12. The apparatus of claim 10, wherein the first power control parameter comprises an uncompensated UL transmit power and the second power control parameter comprises an adjustment to the UL transmit power according to UL open loop power control parameters.

13. The apparatus of claim 12, wherein the UL open loop power control parameters comprise a target received power and a cell specific compensation factor (α).

14. The apparatus of claim 13, wherein the UL open loop power control parameters comprise separate PO and α parameters for two or more subframes having the second subframe type as identified in the bitmap.

15. An apparatus for wireless communication in a time division duplex (TDD) wireless communication system, comprising:
- a processor;
- memory in electronic communication with the processor; and
- instructions being stored in the memory, the instructions being executable by the processor to:
  - receive a bitmap identifying a first group of one or more subframes of a TDD uplink-downlink (UL-DL) configuration and a second group of one or more subframes of the TDD UL-DL configuration having a second subframe type, wherein the first subframe type corresponds to one or more subframes having UL-UL interference between a serving base station and a neighboring base station, and the second subframe type corresponds to one or more subframes having DL-UL interference between the serving base station and the neighboring base station;
  - receive a first indication of a first power control parameter via radio resource control signaling, and a second indication of a second power control parameter via Open Loop Power Control (OLPC) signaling;
  - apply the first power control parameter to the first group of one or more subframes identified in the bitmap as having the first subframe type;
  - apply the second power control parameter to the second group of one or more subframes identified in the bitmap as having the second subframe type; and
  - transmit the one or more subframes to the serving base station.

16. The apparatus of claim 15, wherein the bitmap is received in radio resource control signaling.

17. The apparatus of claim 15, wherein the bitmap is received in signaling via a physical layer control channel.

18. The apparatus of claim 17, wherein the signaling comprises downlink control information (DCI) received on a physical downlink control channel (PDCCH).

19. The apparatus of claim 17, wherein the first power control parameter comprises an uncompensated UL transmit power and the second power control parameter comprises an adjustment to the UL transmit power according to UL open loop power control parameters.

20. The apparatus of claim 19, wherein the UL open loop power control parameters comprise a target received power and a cell specific compensation factor (α).

21. The apparatus of claim 20, wherein the UL open loop power control parameters comprise separate PO and α parameters for two or more subframes having the second subframe type as identified in the bitmap.

22. A computer program product for wireless communication in a time division duplex (TDD) wireless communication system, the computer program product comprising a non-transitory computer-readable medium storing instructions executable by a processor to:
- receive a bitmap identifying a first group of one or more subframes of a TDD uplink-downlink (UL-DL) configuration and a second group of one or more subframes of the TDD UL-DL configuration having a second subframe type, wherein the first subframe type corresponds to one or more subframes having UL-UL interference between a serving base station and a neighboring base station, and the second subframe type corresponds to one or more subframes having DL-UL interference between the serving base station and the neighboring base station;
- receive a first indication of a first power control parameter via radio resource control signaling, and a second indication of a second power control parameter via Open Loop Power Control (OLPC) signaling;
- apply the first power control parameter to the first group of one or more subframes identified in the bitmap as having the first subframe type;
- apply the second power control parameter to the second group of one or more subframes identified in the bitmap as having the second subframe type; and transmit the one or more subframes to the serving base station.

23. The computer program product of claim 22, wherein the bitmap is received in radio resource control signaling.

24. The computer program product of claim 22, wherein the bitmap is received in signaling via a physical layer control channel.

25. The computer program product of claim 24, wherein the signaling comprises downlink control information (DCI) received on a physical downlink control channel (PDCCH).

26. The computer program product of claim 24, wherein the first power control parameter comprises an uncompensated UL transmit power and the second power control parameter comprises an adjustment to the UL transmit power according to UL open loop power control parameters.

27. The computer program product of claim 26, wherein the UL open loop power control parameters comprise a target received power and a cell specific compensation factor ($\alpha$).

28. The computer program product of claim 27, wherein the UL open loop power control parameters comprise separate PO and $\alpha$ parameters for two or more subframes having the second subframe type as identified in the bitmap.

\* \* \* \* \*